United States Patent [19]

Ogawa et al.

[11] Patent Number: 5,372,035
[45] Date of Patent: Dec. 13, 1994

[54] ROBOT FOR DRIVING AN AUTOMOBILE ON A CHASSIS DYNAMOMETER

[75] Inventors: Yasuhiro Ogawa; Shinji Noguchi; Susumu Togawa; Takao Konishi, all of Kyoto, Japan

[73] Assignee: Horiba, Ltd., Kyoto, Japan

[21] Appl. No.: 986,118

[22] Filed: Dec. 4, 1992

[30] Foreign Application Priority Data

Dec. 7, 1991 [JP] Japan ............................. 3-349665

[51] Int. Cl.⁵ .................................................. G01M 17/00
[52] U.S. Cl. ...................................................... 73/117
[58] Field of Search ..................... 73/117, 125, 865.6, 73/865.9, 116

[56] References Cited

U.S. PATENT DOCUMENTS

| | | | |
|---|---|---|---|
| 3,465,577 | 9/1969 | Donovan | 73/117 |
| 3,516,287 | 6/1970 | Masuda et al. | 73/117 |
| 4,442,708 | 4/1984 | Gable et al. | 73/117 |
| 4,466,279 | 8/1984 | Gable et al. | 73/117 |
| 4,495,801 | 1/1985 | Sugimoto | 73/117 |
| 4,554,824 | 11/1985 | King et al. | 73/117 |
| 4,621,525 | 11/1986 | King et al. | 73/117 |
| 4,649,742 | 3/1987 | Klausnitzer et al. | 73/117 |
| 4,790,177 | 12/1988 | King et al. | 73/117 |

FOREIGN PATENT DOCUMENTS

| | | | |
|---|---|---|---|
| 2004979 | 2/1970 | Germany | G01M 17/00 |
| 3744631 | 12/1987 | Germany | G01M 17/00 |
| 3940588 | 12/1989 | Germany | B25J 11/00 |
| 4027711 | 8/1990 | Germany | G01M 17/00 |

OTHER PUBLICATIONS

German Periodical: ATX-Automobiltechnische Zeitschrift 88, 1986, 7/8, pp. 417–419.

Primary Examiner—Hezron E. Williams
Assistant Examiner—George M. Dombroske
Attorney, Agent, or Firm—Poms, Smith, Lande & Rose

[57] ABSTRACT

A robot for driving a vehicle safely stops the vehicle's engine even in the event of an accident such as an electric power failure or operating error. A robot body is provided with an ignition key-operating actuator consisting of a holder member for holding an ignition key of an automobile, a shaft for turning the holder member, and a motor for driving the shaft. An actuator for operating an accelerator pedal may be returned to a zero point by an emergency power source provided within a control unit, after which the key actuator operates the ignition key to stop the engine, for example, when a power source for the control unit is turned off. In this case, if it is dangerous to stop the engine, it is not necessary to do so.

7 Claims, 12 Drawing Sheets

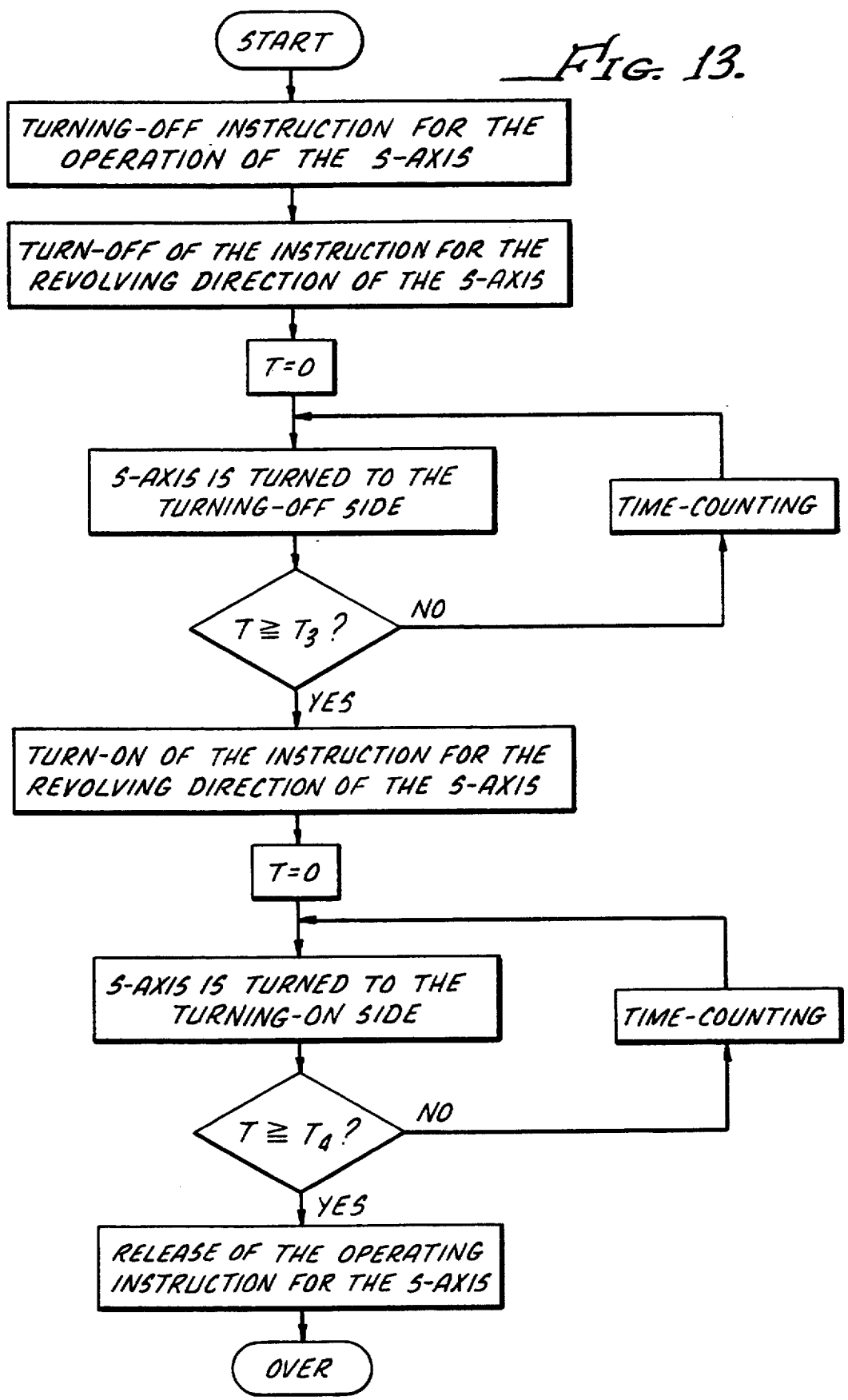

ROBOT FOR DRIVING AN AUTOMOBILE ON A CHASSIS DYNAMOMETER

BACKGROUND OF THE INVENTION

1. Field of the Invention

This invention relates to a robot for driving a vehicle such as an automobile, in particular for the case where the performance of the vehicle is to be tested using a chassis dynamometer.

2. Description of Related Art

In conventional vehicle tests such as automobile emissions tests and fuel-cost tests, the automobile is mounted on a chassis dynamometer and is then operated according to a predetermined driving profile. In order to reduce labor costs and improve test repeatability, robots have been used to "drive" the vehicle.

An example of a robot apparatus for driving an automobile is disclosed in the laid-open Japanese Utility Model Application No. Sho 63-190,944 has been known as said robot for driving an automobile. This apparatus for driving an automobile is provided with an actuator that comprises an arm, which operates the accelerator pedal, and a driving device, which reciprocates the arm. The degree to which the accelerator is applied is regulated by reciprocating the arm to operate the accelerator pedal so that the test automobile is "driven" according to a previously defined driving or operational profile.

When a motor is driven according to an operational profile using such a conventional robot, however, when the motor pops out of gear or too great a difference arises between an intended car speed and the actual car speed, the robot disengages the accelerator actuator from the accelerator pedal, shifts the automobile's gear-shift lever to a neutral position by a shift lever-operating actuator, and the engine is shut off.

In the above-described conventional robot for driving an automobile, however, the robot does not directly turn the vehicle's ignition key, but rather it switches wiring within an engine compartment with the respective relays of a controller in order to stop the engine. In addition, in the case where the controller's power source is switched off due, for example, to an electric power failure, the accelerator actuator is disengaged from the accelerator pedal by using a mechanical member such as a spring.

Using a conventional robot for driving an automobile, therefore, when some serious problem occurs, the robot cannot shut off the vehicle's engine in a secure manner. The automobile's engine and transmission may thereby suffer severe damage; indeed, in some circumstances, the automobile itself may even jump out of the chassis dynamometer and endanger those around it.

SUMMARY OF THE INVENTION

Considering the drawbacks of conventional technology described above, one object of the invention is to provide a robot for driving a vehicle that securely and safely stops the vehicle's engine even when unplanned circumstances arise, such as a failure in the electric power supply or an error in operation.

In order to achieve this object, a first embodiment of a robot for driving a vehicle includes a robot body and an ignition key-operating actuator. The ignition key actuator in turn comprises a holder member for holding the vehicle's ignition key, a shaft for turning the holder member, and a motor for driving the shaft. A driver unit includes an emergency power source, which is provided for returning the accelerator actuator to a "zero point" or "null position" when a power source for the driver unit has been shut off.

In the embodiment described above, when the accelerator actuator is returned to the zero point or null position, the ignition key may be operated by the ignition key-operating actuator to stop the engine.

In addition, a robot for driving an automobile according to a second embodiment of the invention comprises a robot body and an ignition key-operating actuator. The key actuator includes a holder member for holding the vehicle's ignition key, a shaft for turning the holder member, and a motor for driving the shaft. A shift lever-operating actuator is also provided in order to return the vehicle's shift lever to a neutral position when the accelerator actuator is returned to the zero point or null position, followed by shutting off a power source for a controller.

In the embodiment described above, a brake pedal-operating actuator may also be provided to depress a brake pedal. After the shift lever is returned to the neutral position, the brake actuator applies the brake until the vehicle's speed reaches zero, the brake is then released, and power to a controller is then turned off.

According to a third embodiment of the invention, a robot for driving an automobile according to a second embodiment of the invention comprises a robot body and an ignition key-operating actuator. The key actuator includes a holder member for holding the vehicle's ignition key, a shaft for turning the holder member, and a motor for driving the shaft. An actuator for operating the vehicle's accelerator pedal is returned to a zero point or null position and a shift lever-operating actuator returns a shift lever to a neutral position, after which the ignition key actuator turns the ignition key to stop the engine.

In the embodiment described above, the shift lever may be returned to the neutral position by means of the shift lever-operating actuator. The brake actuator then applies the brake and releases the brake when the vehicle's speed reaches zero. The ignition actuator then turns the ignition key to stop the engine.

According to any one of the embodiments described above, the vehicle's engine can be stopped securely and safely by the robot.

BRIEF DESCRIPTION OF THE DRAWINGS

FIG. 13 is a flow chart showing another example of procedures for stopping the engine.

DETAILED DESCRIPTION OF THE PREFERRED EMBODIMENTS

The preferred embodiments of the invention are described below with reference to the drawings.

Figure 1:
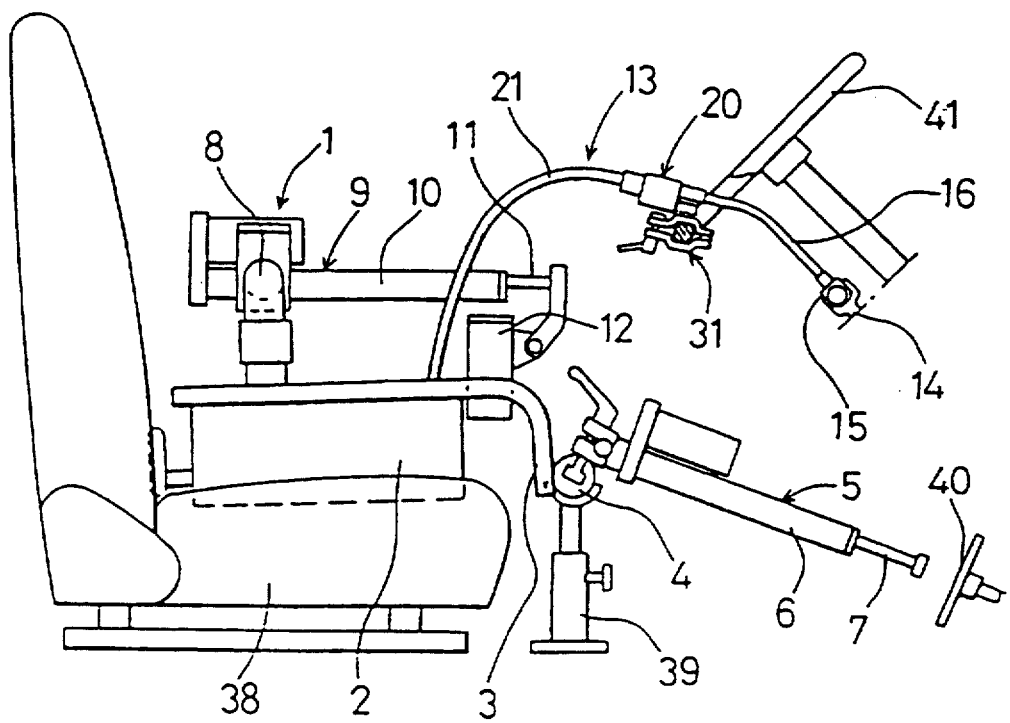
FIG. 1 is a side view showing a robot for driving an automobile according to the invention.

Referring to FIG. 1, reference numeral 1 designates a robot for driving a vehicle such as an automobile, reference numeral 2 designates a robot body, and reference numeral 3 designates a fitting bar mounted on the robot body 2. The fitting bar 3 projects forward from the robot body 2 and a support rod 4 is mounted on the fitting bar 3. Reference numeral 5 designates a pedal-operating actuator, which comprises a support pipe 6 and a slide arm 7. The slide arm 7 is arranged in the support pipe 6 so as to advance and retract and is mounted on the support rod 4. A pedal-operating actuator 5 is provided for each of the respective pedals for the accelerator, brake and clutch of the vehicle, although only the nearest of these is visible in the elevational view shown in FIG. 1.

Reference numeral 8 designates a support cylinder that stands on the robot body 2 and is provided with a shift lever-operating actuator 9 (the "shift actuator"). The shift actuator 9 comprises a support pipe 10 and a slide arm 11, which is provided in the support pipe The slide arm 11 is provided with a clip 12 for supporting a shift lever (not shown) and is mounted on a pointed end of the shift lever. In addition, the respective pedal-operating actuators (one each for the accelerator, brake and clutch), and shift lever-operating actuators (for gear selection along an X-axis and shifting along a Y-axis) are driven by five respective DC servomotors (not shown).

Reference numeral 13 designates an ignition key-operating actuator (the "key actuator") that comprises a holder member 15 for holding an ignition key 14, a flexible shaft 16 for turning the holder member 15, a driving portion 20, which consists of an S-axis motor 17 (whereby the S-axis is the axis of the ignition key), a gear box 18, a rotation-transmitting coupling portion 19 (see FIG. 2), and a cable 21 for connecting the driving portion 20 with the robot body 2. The rotation-transmitting coupling portion 19 is adapted to be have a non- or pre-engagement range of about 90° and the flexible shaft 16 and the driving portion 20 can be mutually rotated within an angular range of motion of about 90°.

Figure 3:
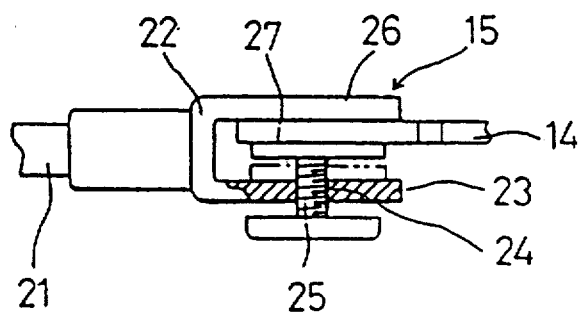
FIG. 3 is an enlarged partial sectional view showing a holder member.

As FIG. 3 shows, the holder member 15 comprises a -shaped support member 22, a cap screw 25 that is screwed into a tapped hole 24 formed in one supporting wall 23 of the support member 22, and a counter plate 27 that is mounted on a pointed end of the cap screw 25 opposite to the other supporting wall 26 of the support member 22. The flexible shaft 16 is mounted on the support member 22.

Figure 4:
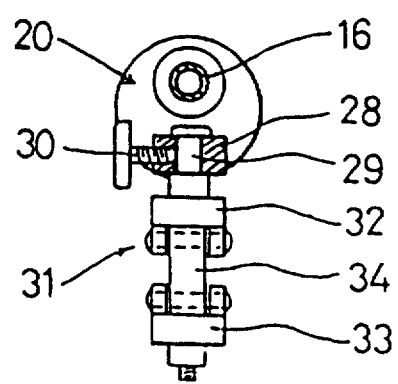
FIG. 4 is a side sectional view showing the ignition key-operating actuator.

In FIG. 4, reference numeral 28 designates a bracket that projects from the driving portion 20. The bracket 28 is provided with a support shaft 29, which is rotatably mounted on the bracket. The bracket also has a lock screw 30, whose pointed end is brought into contact with the support shaft 29 to fix the support shaft 29 relative to the bracket 28 and out of contact with the support shaft 29 to allow it to rotate relative to the bracket 28.

Figure 2:
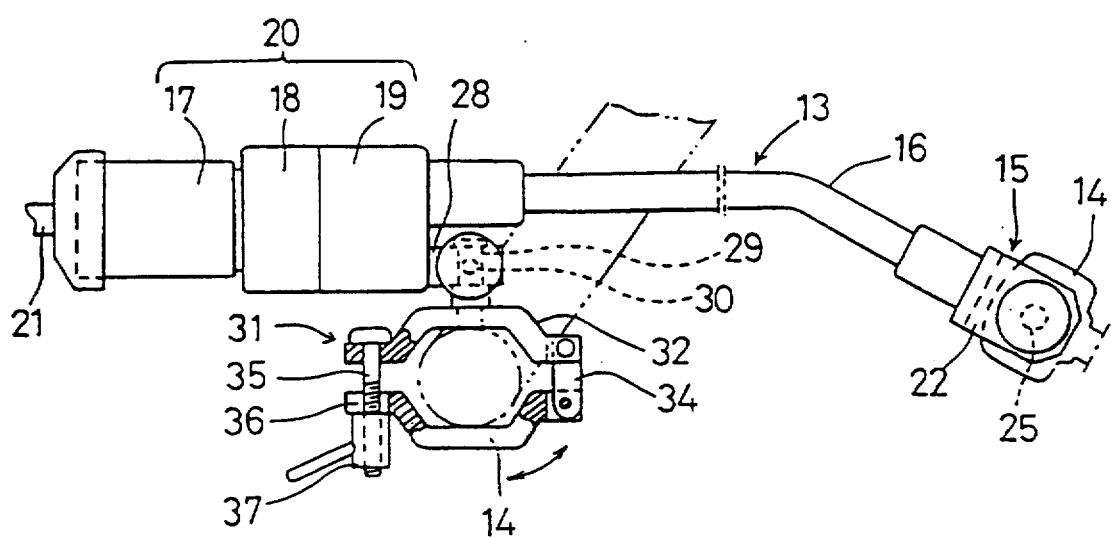
FIG. 2 is an enlarged partial sectional view showing an ignition key-operating actuator.

Referring to FIGS. 2 and 4, reference numeral 31 designates a support member comprising a fixed member 32, a movable member 33, a link 34 whose end portions are connected, respectively, to the fixed member 32 and movable member 33 to connect these members, and a connecting bolt 35 that passes through the end of the fixed member 32 opposite the link 34. A notched concave portion 36 is provided at the same end of the movable member 33 as the connecting bolt 35. The connecting bolt 35 engages the notched concave portion 36 and a support nut 37 engages the connecting bolt 35. The fixed member 32 is securely mounted on a middle portion of the support shaft 29 so that the driving portion 20 and the support member 31 may be mutually rotatable.

The robot 1 according to the invention for driving a vehicle such as an automobile is set on a driver's seat 38 as follows: as shown in FIG. 1, the robot body 2 is placed on the driver's seat 38 of the automobile. The robot body is then fixed in place on the seat 38 and the like by means of a fixing member, such as a belt (not shown). In mounting the robot body, the support rod 4 that projects forward from the seat 38 is supported by a supporting leg 39 and the pedal-operating actuator 5 is located opposite to its respective pedal.

The support nut 37 of the support member 31 is loosened and the movable member 33 is then moved in the direction shown by an arrow in FIG. 2. By revolving the link 34 to separate the notched concave portion 36 from the connecting bolt 35, a part of a handle 41 of the automobile can be put between the fixed member 32 and the movable member 33. After the handle 41 is placed between the fixed member 32 and the movable member 33 in the above described manner, the connecting bolt 35 is inserted into the notched concave portion 36 and the support nut 37 is tightened down to mount the fixed member 32 and the movable member 33 securely on the handle 41; the driving portion 20 is thereby mounted on the handle 41. In addition, the lock screw 30 is unfastened so that the driving portion 20 can rotate relative to the bracket 28. It is then easy to regulate the position of the holder member 15 relative to the ignition key 14.

In this condition, the cap screw 25 in the holder member 15 is turned to move the counter plate 27 to the side of the support wall 23, as is shown by a dash-dotted line in FIG. 3. The driving portion 20 is then turned relative to the bracket 28 and the flexible shaft 15 bent to insert an end portion of the ignition key 14 into an ignition switch of the automobile between the supporting wall 26 and the counter plate 27. To mount the holder member 15 on the ignition key 14, the cap screw 25 is first loosened so that the end portion of the ignition key 14 fits between the counter plate 27 and the supporting wall 26. The cap screw 25 is then tightened down on the counter plate 27 so that the key 14 is clamped between the counter plate 27 and the supporting wall 26. After the holder member 15 is securely mounted on the ignition key 14, the lock screw 30 is tightened, thereby securing the driving portion 20 on the bracket 28.

The procedures for setting the ignition key-operating actuator 13 described may be varied. For example, the support member 31 may be made rotatable relative to the handle 41 when the holder member 15 is mounted on the ignition key 14; this makes the positional regulation of the holder member 15 relative to the ignition key 14 even easier.

As is described above, after the holder member 15 is secured on the ignition key 14, the engine is started when the ignition key 14 is turned in the engine-starting direction by means of the S-axis motor 17 of the driving portion 20 via the flexible shaft 16 and the holder member 15. After it is detected that the engine has turned over, the S-axis motor 17 rotates in the reverse direction to within the non-engagement range of the rotation-transmitting coupling portion 19 and is then stopped.

The instruction to rotate the S-axis motor 17 to start the engine can also be varied. For example, the S-axis motor 17 may be rotated in the clockwise direction to start the engine. Then, after passing beyond the non-engagement range in the clockwise direction of the rotation-transmitting coupling portion 19, the ignition key 14 is rotated in the clockwise direction via the flexible shaft 16 and the holder member 15. Once the ignition key 14 is rotated to the running position, the clockwise rotation of the S-axis motor 17 is continued. When the robot 1 for driving an automobile according to the invention detects the start of the engine, the S-axis motor 17 is rotated about 90° in the counter-clockwise direction and is stopped. The rotation-transmitting coupling portion 19 is then in the non-engagement range, so that the ignition key 14 is returned to an "on" position by the action of a return spring for the key switch; this completes the engine start-up procedure.

As is described above, after the engine is started by means of the ignition key-operating actuator 13, the automobile can be driven in accordance with the previously appointed operational profile by the actions of the pedal-operating actuator 5 and the shift lever-operating actuator 9.

When the "driving" of the automobile is over, the S-axis motor 17 is rotated in the counter-clockwise according to an engine-stopping instruction. At the end of the angular non-engagement range of the rotation-transmitting coupling portion 19, the ignition key 14 is rotated in the engine-stopping direction via the flexible shaft 16 and the holder member 15. When the robot 1 for driving an automobile according to the invention detects that the engine has stopped, the S-axis motor 17 is rotated about 90° in the clockwise direction to complete the procedure for shutting off the engine.

As is described above, in order to securely mount the holder member 15 on the ignition key 14, the ignition key-operating actuator 13 clamps the ignition key 14 against the supporting wall 26 by means of the counter plate 27 of the cap screw 25. The ignition key 14 can thus be securely clamped regardless of any hole or the like that may be in the key. Moreover, the ignition key 14 may be pressed directly by means of the cap screw 25, without providing the counter plate 27.

Figure 5:
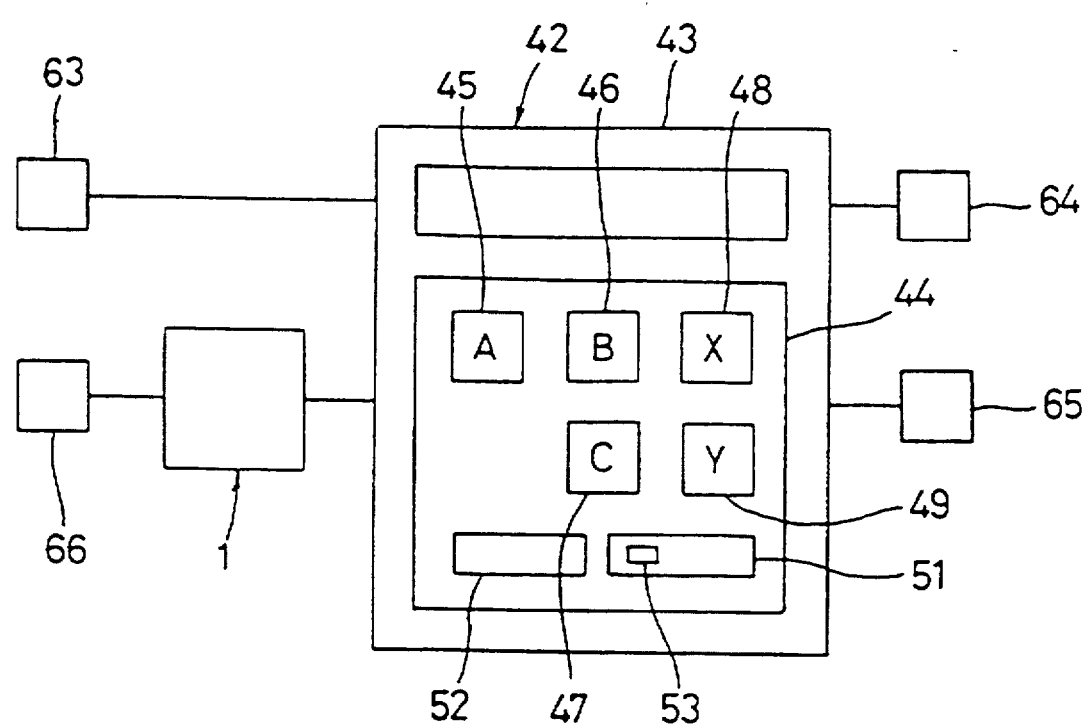
FIG. 5 is a drawing roughly showing a construction of a circumference of a robot body.

FIG. 5 illustrates roughly the configuration of the robot body 2 described above. Referring to FIG. 5, reference numeral 42 designates a control panel that comprises a control unit 43 and a driver unit 44 for controlling the robot body 2. The control unit 43 is, for example, provided with a control CPU and a man-machine interface CPU. The driver unit 44 has five drivers that output a signal to each of five DC servomotors and the S-axis motor 17 provided in the robot body 2. The five drivers are A-axis (accelerator) driver 45, a B-axis (brake) driver 46, a C-axis (clutch) driver 47, an X-axis (gear select X) driver 48 and a Y-axis (gear shift Y) driver 49. A power source portion 51 and an emergency control circuit 52 are also included.

The power source portion 51 is connected with an external power source of, for example, 200 V AC. The 200 V AC may be transformed, for example, down to 100 V AC to be supplied not only to the respective drivers 45-50 but also, via a switch (not shown) to the control unit 43. In addition, the power source portion 51 has an emergency power source 53 for releasing the A-axis to off-rotate the S-axis in case of emergency.

Figure 6:
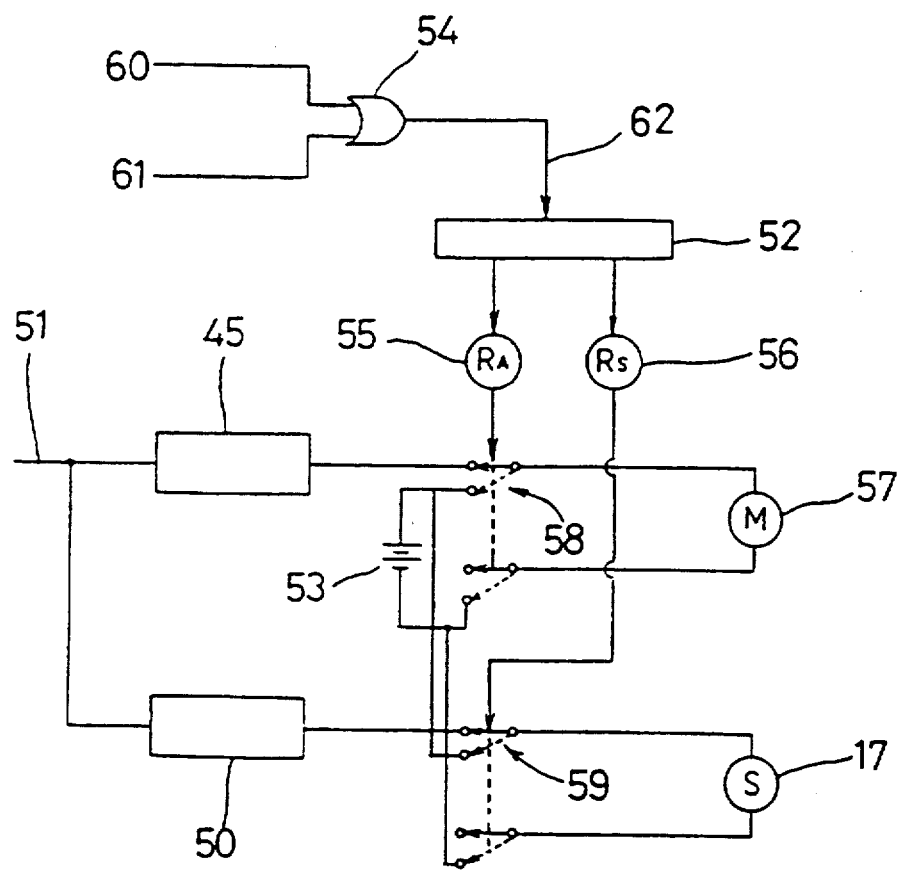
FIG. 6 is a drawing illustrating the electrical connection of a power source circuit, an emergency control circuit and an emergency power source.

FIG. 6 shows the connections among the power source portion 51, the emergency control circuit 52 and the emergency power source 53. Referring to FIG. 6, reference numeral 54 designates an OR-circuit; reference numerals 55 and 56 designate a relay; reference numeral 57 designates an A-axis motor; and reference numerals 58 and 59 designate a change-over switch. An emergency stop or shut-off signal 62 is generated in two cases: 1) when an external signal is input at terminal 60 to indicate, for example, a malfunction of the chassis dynamometer or an emergency stop button is pushed for any reason or a power source switch is turned off for some reason and shuts off a power source is turned off; or 2) when an external signal is input at terminal 61 indicating CPU error or failure. In either case, the emergency stop signal 62 is input to the emergency control circuit 52 and the relays 55, 56 are then operated to change over the change-over switches 58, 59. The A-axis motor 57 and the S-axis motor 17, which are always supplied with 100 V AC from the power source portion 51, are then supplied with a voltage from the emergency power source 53.

Referring once again to FIG. 5, reference numeral 63 designates a sensor for detecting the rotation speed (in, for example, rpm) of a roller of chassis dynamometer (not shown), reference numeral 64 designates a recorder connected with the control unit 43 through a digital-to-analog converter (not shown), reference numeral 65 designates an external input device connected with the control panel 42 through a peripheral input-output device (not shown), and reference numeral 66 designates a sensor for detecting the rotation speed (in, for example, rpm) of the vehicle's engine.

Emergency stopping or shut-down of the robot for driving an automobile according to the invention is divided generally into two types: hardware stopping and software stopping. Moreover, hardware stopping is further divided into an emergency stop of the control unit 43 and an emergency stop of the driver unit 44.

The emergency stop of the control unit 43 results from the following causes:

(1) Input of the external emergency stop or shut-off signal;

(2) Switch-on of the emergency stopping switch provided in a front panel of the control panel 42;

(3) Turn-off of the electric power supplied from the driver unit 44;

(4) Error in the CPU of the control panel 42; and (5) Software command of an emergency stop.

Figure 7:
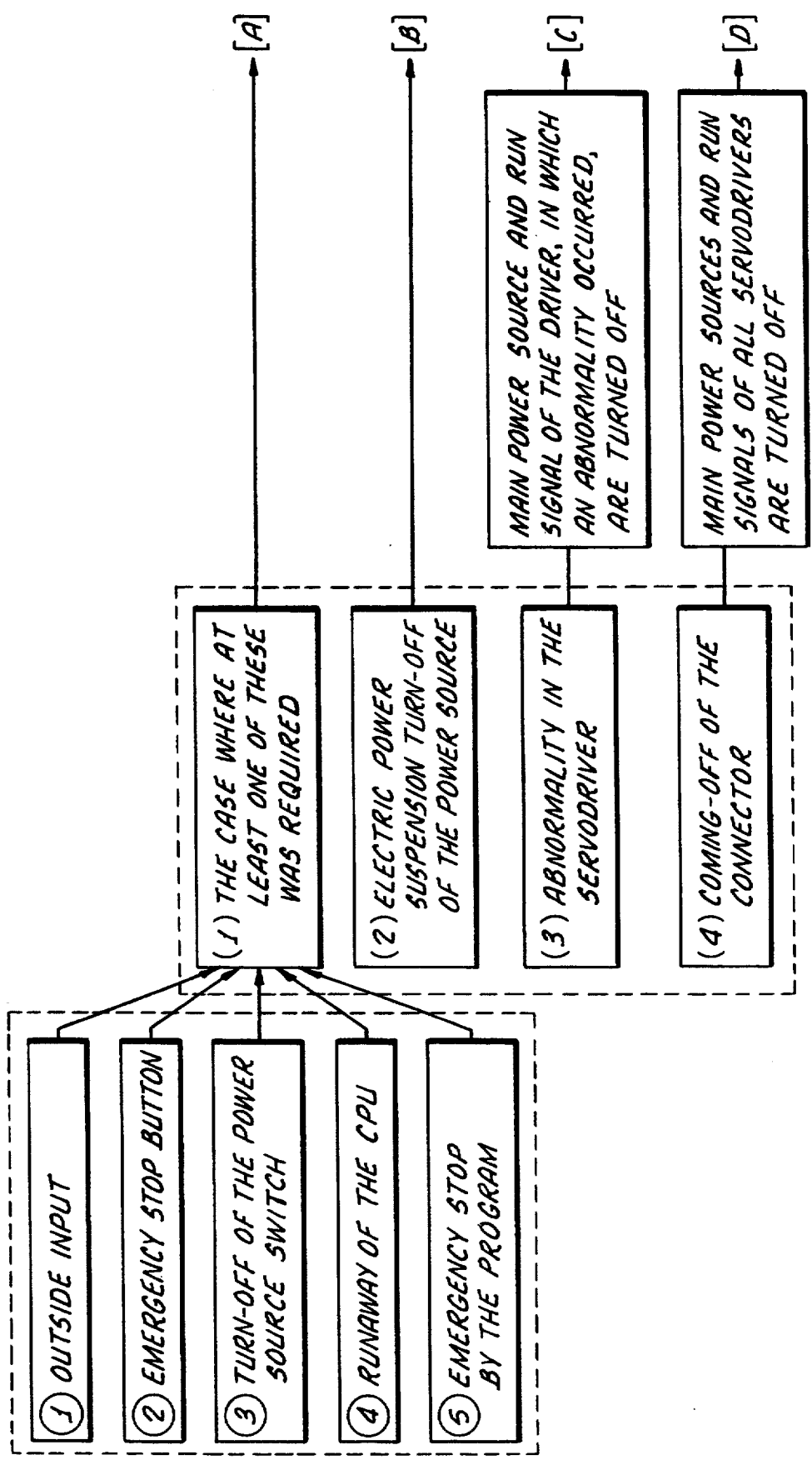
FIG. 7, in conjunction with FIG. 8, shows an order of hardware shut-down and, in particular, reasons for emergency stopping of the control panel and a driver unit.

In any one of these cases, the control panel 42 requires emergency stopping of the driver unit 44 (see FIG. 7).

The emergency stop of the driver unit 44 results from the following causes:

(1) The external emergency stopping signal is input, in particular, because of a requirement for at least one of the above-described conditions (1)–(5);

(2) The supply of electric power breaks off or the power source is turned off while the driver unit 44 is operating (in the case where the electric power supplied to the driver unit 44 is turned off);

(3) The servo driver or servo power source malfunction; and (4) The connector comes off or the power source switch of the robot body (refer to FIG. 7) is switched-off.

Figure 8:
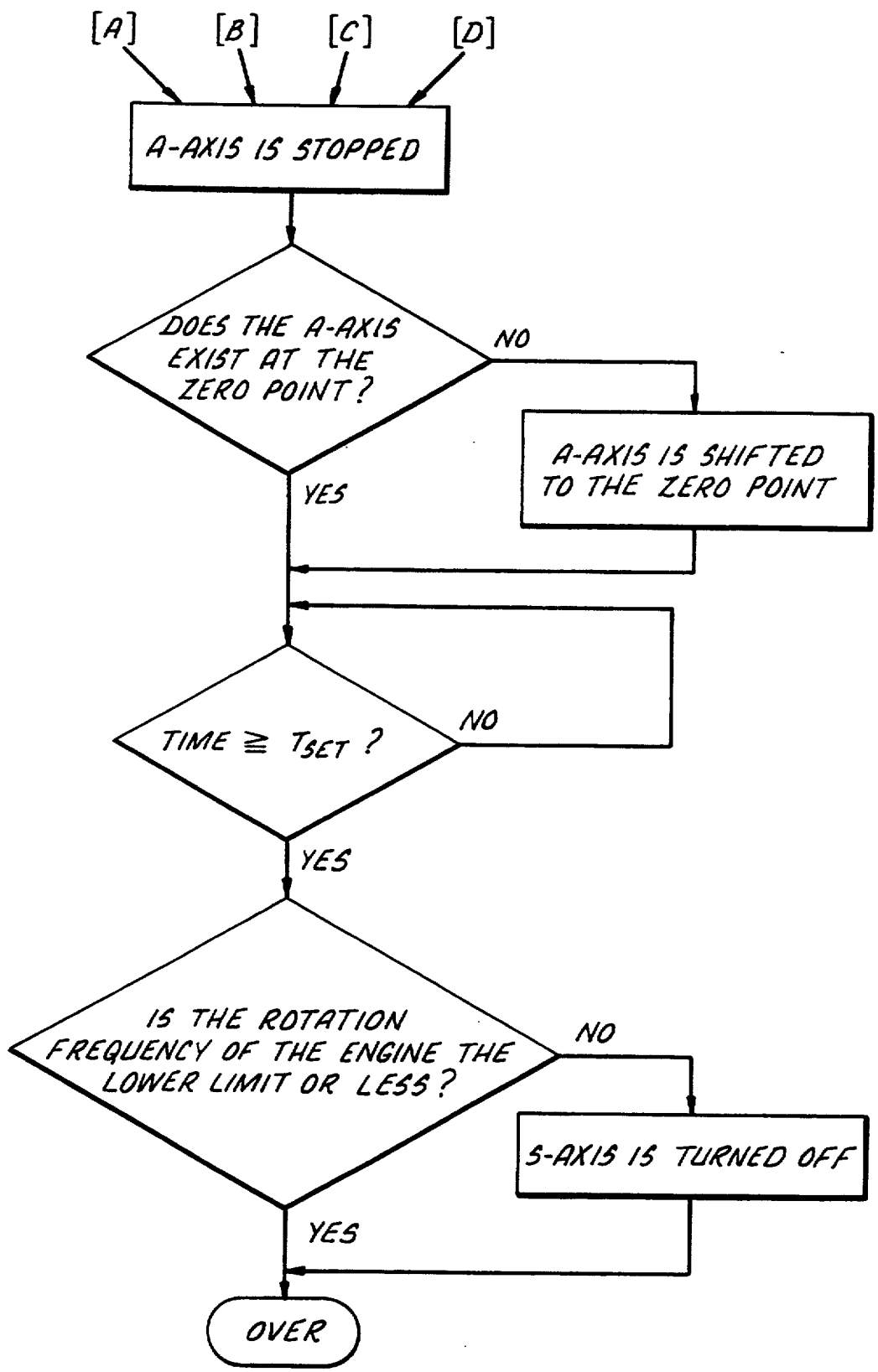
FIG. 8 itself is a flow chart showing an example of procedures for stopping the hardware.

In every one of the cases described above, the accelerator pedal-operating actuator is returned to the zero point or null position by the emergency power source 53, which is provided in the control unit 43 in accordance with the procedures shown in FIG. 8. The ignition key 14 is then operated by means of the ignition key-operating actuator 13 and the engine is then stopped. In addition, in this case, if it is dangerous to stop the engine, only the accelerator actuator is returned to the zero point. In FIG. 7, [A], [B], [C], [D] are to be followed by [A], B], [C], [D] in FIG. 8, respectively.

When the control panel 42 cannot continue operating, for example, because of CPU error, it is sufficient that the accelerator pedal-operating actuator be returned to the zero point. The shift actuator 9 then returns the shift lever to the neutral position, the brake actuator applies the brake and releases the brake when the vehicle's speed has reached zero, and the power source to the control panel 42 is then switched off. In this case, if it is dangerous to operate the brake pedal, this step may be omitted.

Software stopping requires interrupting a program (such as AUTO ADJUST, LEARNING, PROGRAM DRIVE and the like) when an error occurs during the running of the program. Such errors include the case in which an abnormality arises in the control operation, for example, the automobile departs from the operational profile even though the respective parts of the robot 1 for driving an automobile are operating normally when the automobile is driven in accordance with the predetermined operational profile.

Figure 9:
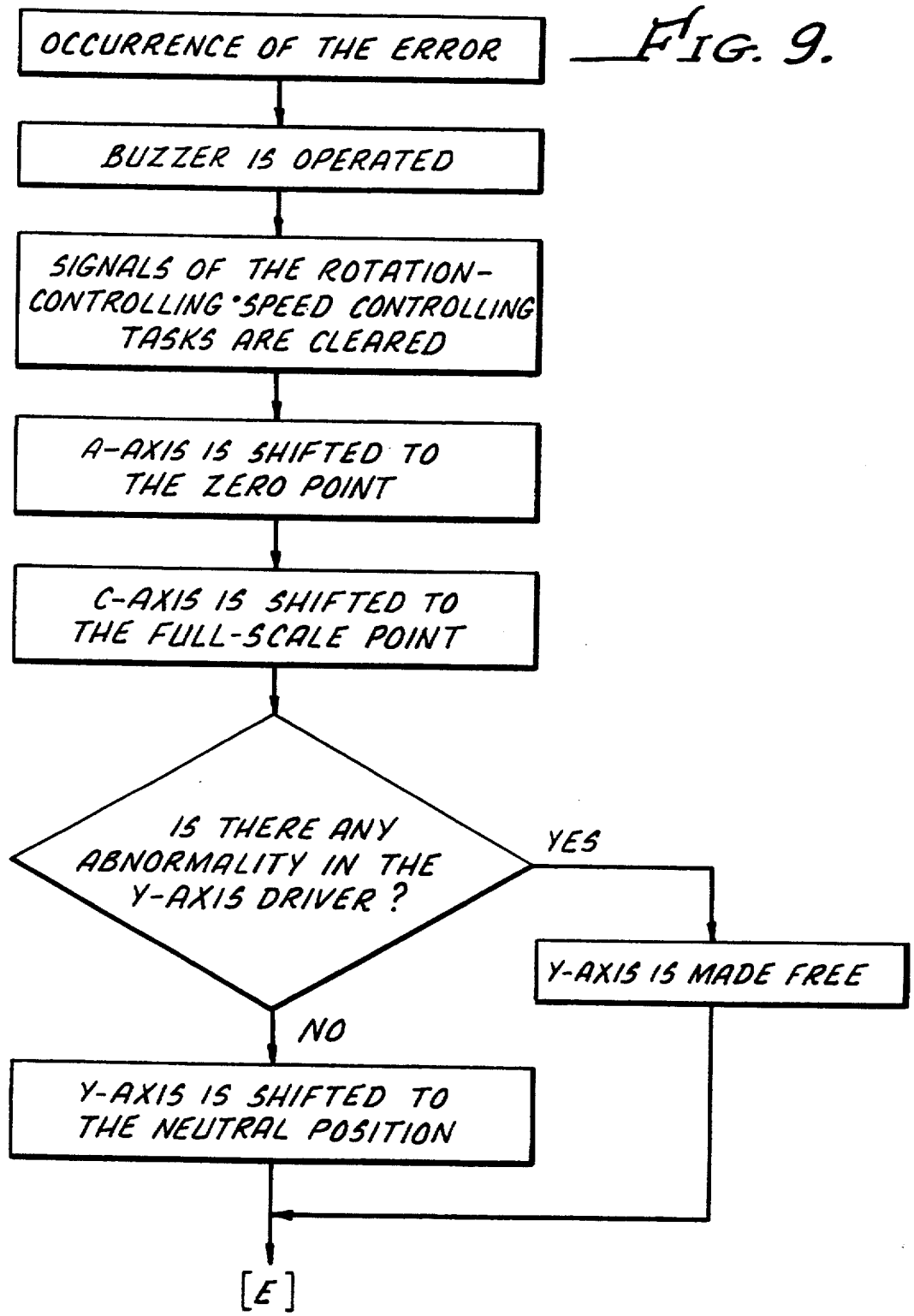
FIG. 9, in conjunction with FIG. 10, illustrates a software shut-down routine, in particular, procedures from a generation of an error to a return of an Y-axis to a neutral position.
Figure 10:
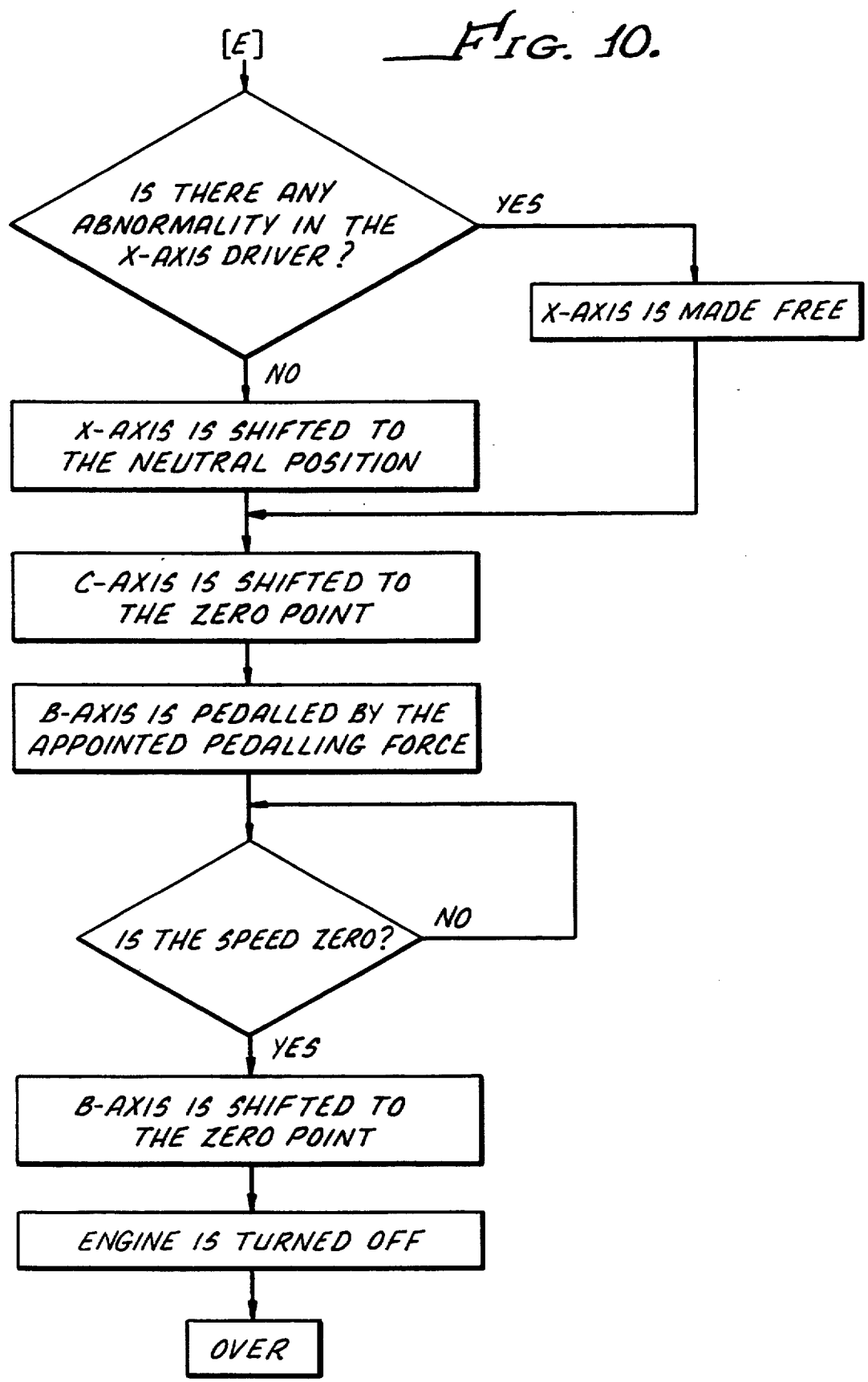
FIG. 10 itself is a flow chart showing procedures up to a final step for returning an X-axis to the neutral position.

In this case, the accelerator actuator is returned to the zero point, the shift actuator 9 returns the shift lever to the neutral position, the brake actuator applies the brake and the engine is turned off when the speed has arrived at zero in accordance with procedures shown in FIGS. 9, 10. In addition, in this case, if it is dangerous to apply the brake, the step of operating the brake is omitted. In FIG. 9, [E] is followed by [E] in FIG. 10.

Figure 11:
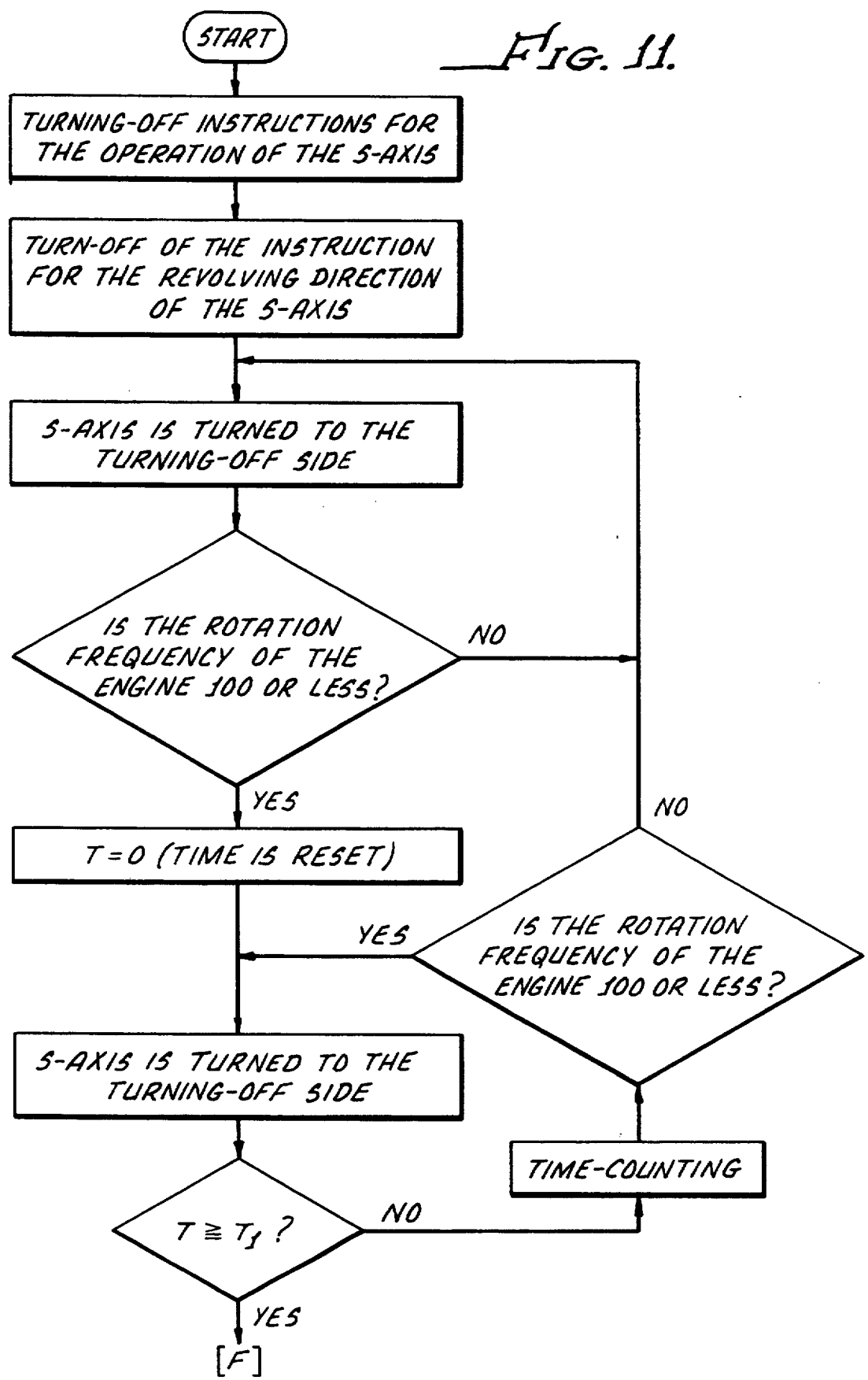
FIG. 11, in conjunction with FIG. 12, shows an example of procedures for stopping an engined in particular, procedures from a starting step to turning an S-axis to an "off" position.
Figure 12:
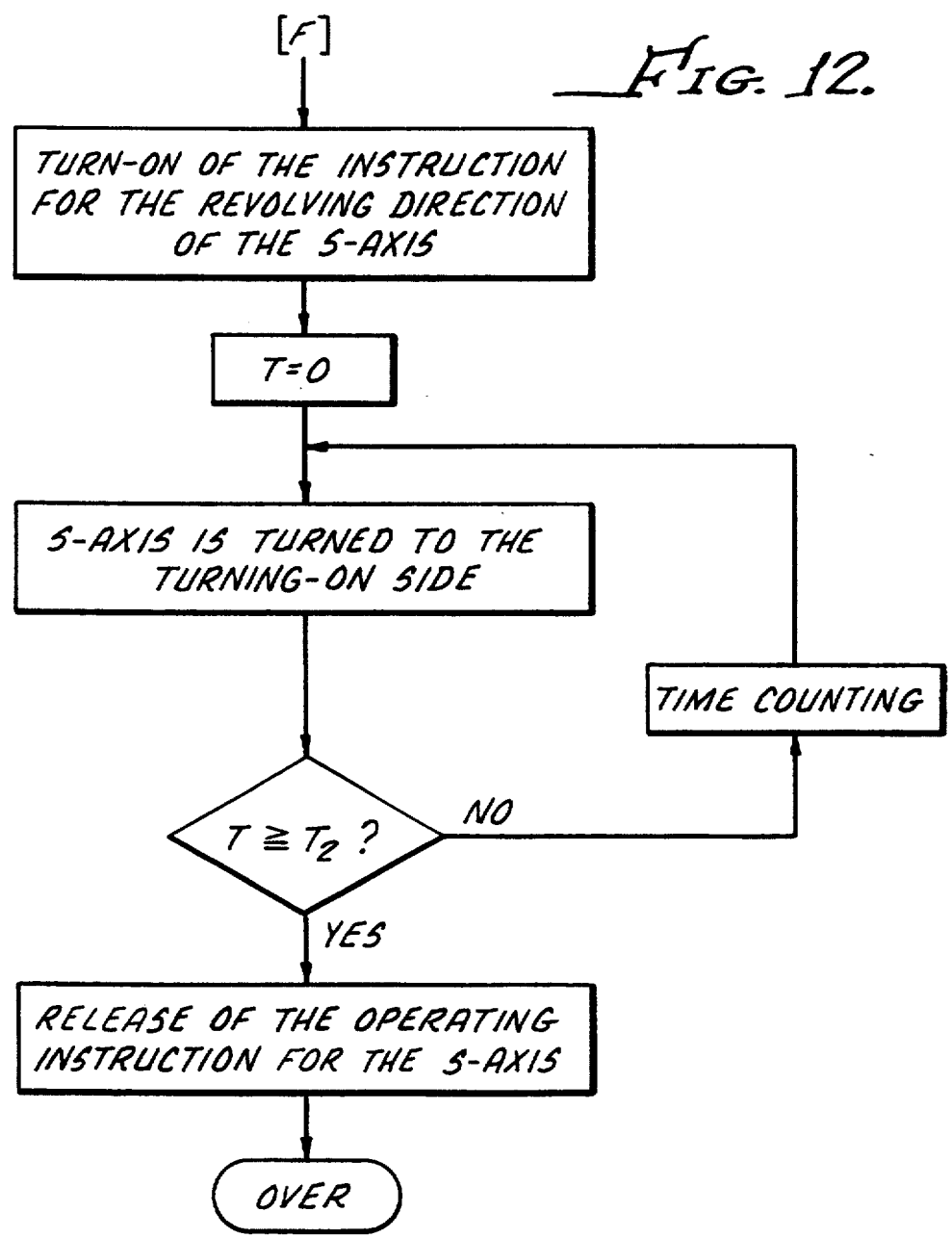
FIG. 12 is a flow chart showing procedures up to a final step from a switch-on instruction for turning the S-axis.

Procedures for stopping the engine include those shown in FIGS. 11, 12 and 13. The engine can be stopped according to any one of these procedures. In FIG. 11, [F] is followed by [F] in FIG. 12.

As is described above, according to the invention, even if an accident suddenly occurs while the robot is driving the vehicle, the robot can be securely controlled so that the operation of driving the vehicle using the robot can be safely stopped. Damage to the transmission, engine and the like of the automobile due to faulty operation of the robot can be minimized and the engine can be stopped securely; the vehicle can therefore be securely prevented from, for example, flying out of the chassis dynamometer.

We claim:

1. A robot for driving a vehicle on a chassis dynamometer comprising:
   a robot body;
   a controller that includes a control unit and a driver unit and is connected to the robot body;
   actuation means including accelerator pedal actuator means for actuating an accelerator pedal of the vehicle;
   ignition key actuator means for operating a vehicle ignition key;
   a main power source connected to the driver unit; and
   an emergency power source connected to the driver unit and to the accelerator pedal actuation means and to the ignition key actuator means to provide emergency actuator control signals which return the accelerator pedal to a null position under power from the emergency power source when power from the main power source fails and turn the ignition key and stop an engine of the vehicle after the accelerator is returned to the null position.

2. A robot as defined in claim 1, in which the ignition key actuator means includes:
   a holder member for holding the ignition key;
   a shaft connected to the holder member for turning the holder member; and
   a motor connected to the shaft for driving the shaft.

3. A robot as defined in claim 1, in which:
   the vehicle includes a gear shift lever;
   the robot further includes shift lever actuator means connected to the gear shift lever for operating the gear shift lever and for returning the gear shift lever to a neutral position in the presence of an operational error; and
   the driver unit is connected to the shift lever actuator means for generating shift actuation signals.

4. A robot as defined in claim 5, in which:
   the vehicle includes a brake pedal;
   the robot includes brake pedal actuator means connected to the brake pedal for applying the brake to slow the operation of the engine and for releasing the brake when a test speed of the vehicle reaches zero; and
   the driver unit is connected to the shift lever actuator means for generating shift actuation signals.

5. A method for test driving a vehicle by robot on a chassis dynamometer comprising the following steps:
   mounting a robot body in a driver's area of a vehicle with an accelerator pedal actuator adjacent to a vehicle accelerator pedal;
   mounting an ignition key actuator on a vehicle ignition key;
   detecting cut-off of an emergency power supply; and
   applying power from an emergency source to the accelerator pedal actuator and to the ignition key actuator to return the accelerator pedal to a zero point and to turn the vehicle ignition key to an off position to stop the vehicle's engine after the accelerator pedal has been returned to the zero point upon detection of cut-off of the main power supply.

6. A method as defined in claim 5, including the following additional steps:
   detecting an operational error; and
   in the presence of the operational error, shifting a gear shift lever of the vehicle to a neutral position by means of a shift lever actuator before the step of turning the vehicle ignition key to the off position.

7. A method as defined in claim 6, including the following additional step:
by means of a brake pedal actuator, actuating a brake pedal of the vehicle to slow a test speed of the vehicle's engine after the step of shifting the shift lever to the neutral position and, before the step of turning the vehicle's ignition key to the off position, releasing the brake pedal when the test speed has reached zero.

* * * * *